INVENTOR.
WILLIAM M. BOYDSTON

ATTORNEY

INVENTOR.
WILLIAM M. BOYDSTON

United States Patent Office 3,287,913
Patented Nov. 29, 1966

3,287,913
IGNITER
William M. Boydston, Costa Mesa, Calif., assignor to Aerojet-General Corporation, Azusa, Calif., a corporation of Ohio
Filed July 9, 1962, Ser. No. 208,539
12 Claims. (Cl. 60—256)

The present invention relates to an improved igniter construction for the propellant grains of rocket engines which construction is particularly advantageous for certain arrangements of the engine in the rocket structure but may be embodied in any type of rocket engine to advantage.

Rocket engines may sometimes be preferably fitted, for maximum compactness, with a minimum clearance between the head of the combustion chamber and the rocket structure forward of the engine, and an axial arrangement of the igniter in such cases is a disadvantage.

Rocket grains are usually provided with a central cavity, the wall of the cavity being sometimes deeply grooved or corrugated, and the igniter is required to start burning of the surfaces evenly over their whole extent. The usual form of igniter consisting of a cartridge of pyrotechnic material held in a basket projecting into the grain cavity and ignited at its forward end does not discharge this duty with maximum efficiency.

It is an object of the invention to provide an igniter structure which may be placed in position at any time before the rocket it to be fired, through the side of the head of the combustion chamber, and if said firing is to be delayed may be readily removed and later repositioned, thus providing both an improved arrangement for an igniter and a desirable safety feature.

Another object of the invention is to provide an igniter having a body of pyrotechnic material of extended length with means to ignite said material instantaneously throughout its length.

A further object of the invention is to provide an igniter having an extended length of pyrotechnic material which is supported throughout its length thus reducing the danger of disintegration due to vibration or shocks in handling or firing.

Still further features and objects of the invention will hereinafter appear from the following description of preferred embodiments of the invention when read with reference to the accompanying illustrative drawings.

Figure 1:
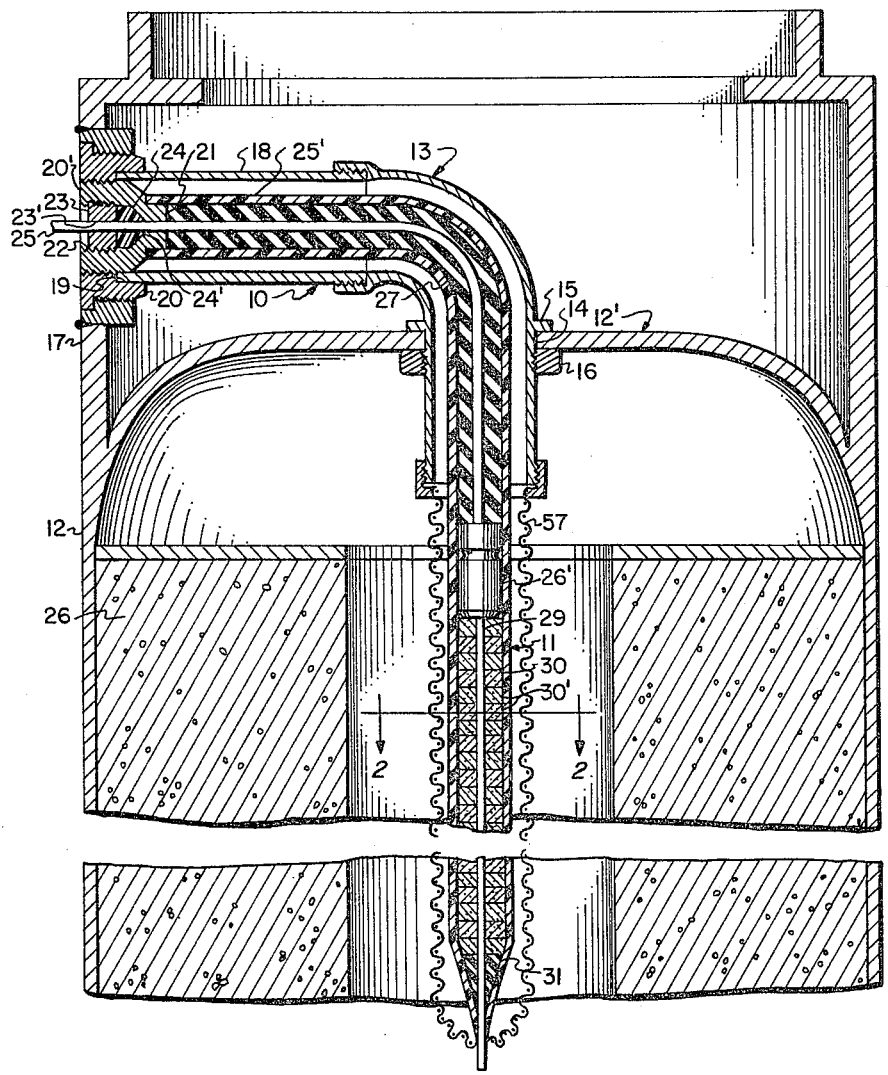
FIGURE 1 is is a central longitudinal section through the forward end of a rocket combustion chamber showing one embodiment of the flexible igniter construction of the invention with the igniter in operative position.
Figure 2:
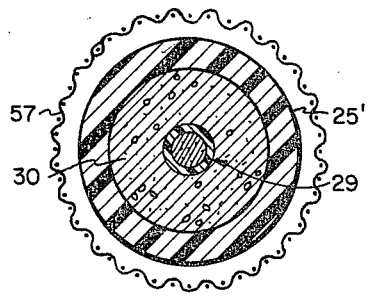
FIGURE 2 is a section on the line 2—2 of FIGURE 1 drawn on an enlarged scale.

Referring now to FIGURE 1, the numeral 10 indicates generally the means effective to mount the igniter 11 in the head portion 12' of the combustion chamber 12 of a rocket motor, and off-center of the longitudinal axis thereof. The means 10 comprises an arcuate adaptor 13 passing through a central hole 14 in the head of the combustion chamber. The adaptor is provided with a peripheral flange 15 which abuts the outer surface of the head 12' and is drawn up tight against it by nut 16. The end of the arcuate tubular adaptor 13 facing the wall 17 of the combustion chamber is undercut to receive one end of a length of tube 18 the opposite end of which is located in a peripheral grove 19 in a pressure ring 20 screwed into a threaded hole in wall 17. A pressure plug 20' is screwed into the pressure ring 20 and is provided with an extension 21 of reduced diameter, and with an interior bore 22 threaded to receive a threaded plug 23. Bore 22 is provided with an angled end 24, and a packing 24' is compressed by plug 23 around an electrical conductor 25 passing through an axial hole 23' in plug 23. The igniter per se comprises a bendable plastic tube 25' the outer end of which is secured on the extension 21, and contains the several elements of the igniter. The tube 25' is curved by being pushed through the adaptor 13 which directs the free end of the tube axially into the central cavity of the propellant grain 26 in the combustion chamber 12.

The parts assembled in the tube 25' comprises a squib 26' inwardly of the inner end of the adaptor, the electric 2-wire conductor 25 leading from the squib 26' through the hole 23' drilled through the pressure plug 23, a spacer 27 such as a length of asbestos cord wound around the electric conductor between the squib 26' and the end of tube 25', a length of fuse 29 connected at one end in the squib 26' and extending axially of tube 25' to its outer end, and a filling of pyrotechnic material 30 packed around the length of flexible fuse 29. The inner end of tube 25' is closed by a small body of cold setting plastic 31 serving also to center the length of the igniter tube 25'.

A suitable type of fuse is produced by Du Pont and marketed under the tradename "Pyrocore" and comprises lengths of thin walled, small bore, flexible metal tubing filed with fast burning pyrotechnic material.

The pyrotechnic material 30 filling the plastic tube 25 may be of any suitable kind, for instance, that produced by the Aerojet-General Corporation and sold under the tradename "Alclo" which may be obtained in the form of pellets 30' with a center hole enabling them to be threaded on the "Pyrocore" fuse 29 and provide an element which can readily follow the curved guide member or adaptor 13.

By this arrangement, it can be appreciated that the igniter 11 may be readily inserted into proper position within the cavity of the propellant grain 25 through the adaptor 13, this being possible since the igniter including the fuse 29 and pyrotechnic pellets 30' is flexible and can adapt to the shape of the adaptor. When the squib 26' is fired the fuse 29 will be ignited thus detonating the pellets 30' which extend a substantial distance within the cavity of the grain 26. Detonation of the pellets will cause almost instantaneous and uniform ignition of the propellant grain 26 throughout its length.

Figure 3:
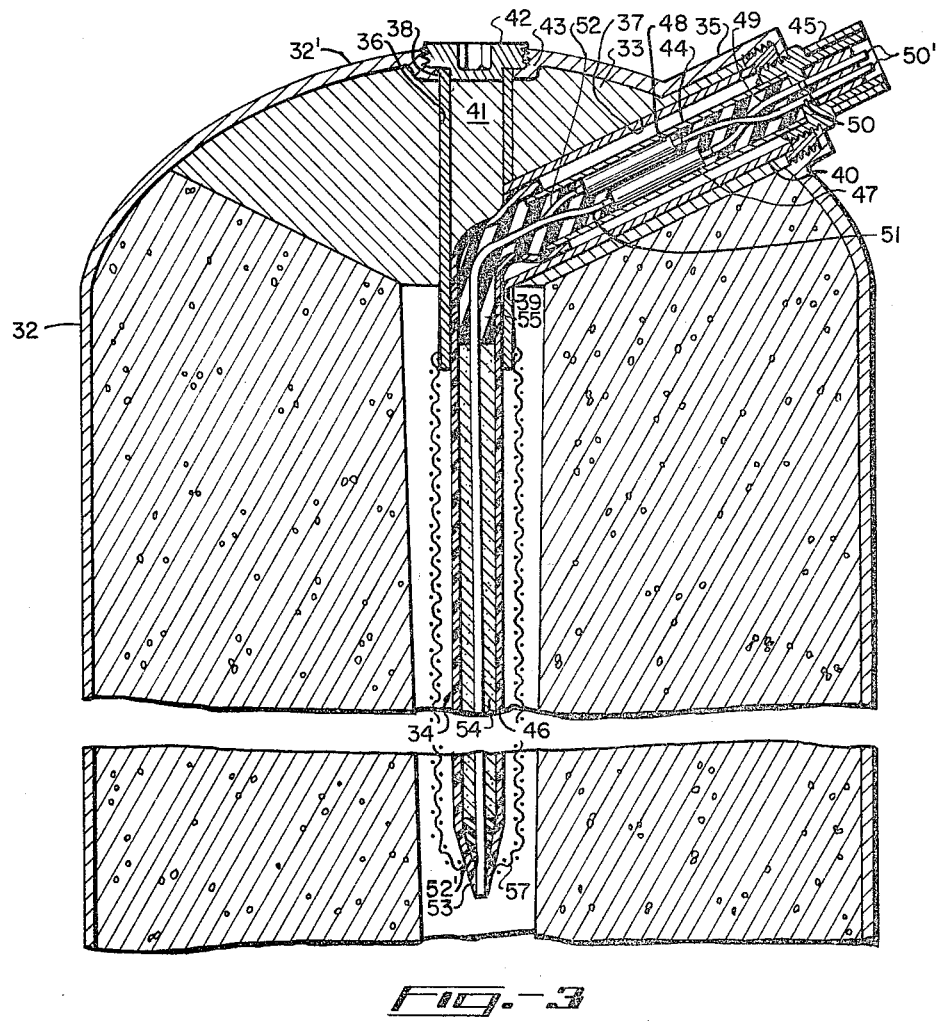
FIGURE 3 is a view similar to FIGURE 1 showing a modified construction of an igniter constructed according to the invention.

In the modification of the invention shown in FIGURE 3, the combustion chamber 32 is shown as furnished with a mounting insert 33 at the forward end of the chamber, a flexible igniter 34 being partly housed in the insert. The head 32' of the combustion chamber is cast with a short lateral tubular extension 35 into which the insert extends. Intersecting bores 36 and 37 are drilled axially of the insert and radially of the insert extending into the tubular extension 35, respectively.

Bore 36 is provided with a short length of guide tube 38 long enough to pass well beyond the intersection with bore 37 and with its inner end reduced in diameter, as by crimping to fit around and guide a part of the igniter 34, later described, which carries pyrotechnic material and a fuse. A hole 39 is drilled in one side of guide tube 38 to receive a second guide tube 40 positioned in bore 37 and seated against tube 38. A short cylindrical guide piece 41 is fitted within the outer end of tube 38, the inner end of guide piece 41 being shaped to provide an extension for tube 40. The outer ends of tube 38 and guide piece 41 are positioned by a pressure plug 42 screwed into a threaded boss 43.

A lead tube 44 of stiff material is positioned in the guide tube 40, the outer end of the tube 40 being fitted in a combined pressure plug and contact receptacle 45 and the lower end being interfitted with the end of a bendable plastic tube 46 of the igniter. Igniter squib means, shown as two in number and indicated at 47 and 48 are positioned in lead tube 44 and are connected by flexible insulated leads 49 and 50 to the pins 50' of the contact receptacle of plug 45. Since the pressure plug and contact receptacle 45 and the squibs may be of known types and construction, specific description of those parts is not considered necessary.

The squibs 47 and 48 initiate the ignition of lengths of fast burning fuse 51 and 52 extending from the squibs to the inner end of tube 46. The lengths of fuse are held in position at their ends by suitable potting material 52' filling the inwardly tapered end 53 of the tube.

Tube 46 is filled with pyrotechnic material 54, such as a suitable mixture of "Alclo" identified hereinabove, the material extending from the inner end of tube 46 to a wrapping such as of asbestos cord 55 separating the pyrotechnic material from the squibs 47, 48, and also serving to maintain the shape of tube 46 at a point where the tube is sharply bent so that the tube remains bent until the rocket motor is fired.

It is preferred to use as the lengths of fuse 51 and 52 "Pyrocore" which is produced and sold by the Du Pont Company and is formed as a thin walled, small bore, metal tube filled with pyrotechnic material. It should be appreciated that the igniter illustrated in FIGURE 3 functions in the same manner as that shown in FIGURE 1, the igniter causing uniform ignition of the grain along its length in the combustion chambers.

If necessary to support the elongated igniter tubes shown in either FIGURE 1 or FIGURE 3 a tube of plastic mesh 57 may be mounted on the inward end of the adaptor tubes 13 and 38, respectively. The diameter of the tube 57 is preferably greater than that of the plastic igniter tube so as to surround it but the tube 57 is reduced in diameter at its inner end to support the tapered inner end of the igniter tube.

It will be noted that by fitting the plastic igniter construction herein described a shorter length of rocket engine may be obtained.

Preferred embodiments of the invention have been specifically described and shown by way of explanation and illustration of the invention but not as limitative of the scope thereof since various modifications may be made in the described embodiments by those skilled in the art without departing from the scope of the invention as defined by the appended claims.

I claim:

1. In a rocket engine, a combustion chamber having a propellant grain with a central cavity therein, a tubular guide member having its inner end opening axially of said combustion chamber and its outer end secured in the wall of said combustion chamber offset from the longitudinal axis thereof, a bendable tube longer than said tubular guide member adapted to be pushed through said tubular guide member to extend from the wall of said combustion chamber and project axially into the central cavity of said propellant grain, pressure sealing means effective to hold the outer end of said tube to the wall of said combustion chamber, pyrotechnic material enclosed in said bendable tube within said grain cavity, means arranged within said bendable tube operable to ignite said pyrotechnic material throughout the length thereof, and electrical means passing through said pressure sealing means for energizing said igniting means.

2. In a rocket engine as set forth in claim 1 wherein said means operable to ignite said pyrotechnic material comprises: squib means mounted in said bendable tube connected to said electrical means, and a length of flexible fuse extending from said squib means and adapted to be ignited thereby and extending through the length of said pyrotechnic material enclosed in said bendable tube.

3. In a rocket engine as set forth in claim 2, wherein a filler of inert material is positioned in said bendable tube between said squib means and said pressure sealing means.

4. In a rocket engine as set forth in claim 2 wherein said pyrotechnic material comprises a plurality of pyrotechnic pellets having central openings therein, and said flexible fuse passing through the central openings in said pellets.

5. In a rocket engine as set forth in claim 1, further including a tubular screen retainer mounted at one end on the inner end of said tubular guide member and surrounding the end portion of the bendable tube extending into said grain cavity.

6. In a rocket engine as set forth in claim 1 wherein said bendable tube is made of plastic material.

7. In a rocket engine, a combustion chamber having a head at one of its ends, a propellant grain with a central cavity in said combustion chamber, an insert in the head of said combustion chamber, a first length of a tubular guide member extending axially through said head of the combustion chamber and said insert terminating near the inner face thereof, a second length of tubular guide member extending outwardly from the longitudinal axis of said combustion chamber and having its inner end intersecting the wall of said first length of tubular guide member, means positioning the outer end of said second tubular guide member in the head of said combustion chamber, a first tube projecting inwardly in said second tubular guide member to a position adjacent but outwardly of the inward end of said second tubular guide member, a length of bendable tube fitted at one end to the inward end of said first tube extending into and through said first tubular guide member and projecting into the central cavity in said propellant grain, a member filling the first tubular guide member from the outer end thereof in the head of the combustion chamber to the intersection of said first and second tubular guide members and having its inner face shaped to guide the inner end of the length of bendable tube into the central cavity in said grain during placement of said bendable tube, electrically initiated igniter means positioned in said first tube, elongated flexible fuse means connected to said igniter means and extending throughout the length of said bendable tube, and pyrotechnic material packed into said bendable tube to extend within the cavity in said propellant grain.

8. In a rocket engine, a combustion chamber having a propellant grain with a central cavity therein, a tubular guide member having its inner end opening axially of said combustion chamber and its outer end opening through the wall of said combustion chamber at a position offset from the longitudinal axis thereof, an elongated bendable igniter means comprising an elongated tube, the major portion of which is made of a flexible plastic material longer than said tubular guide member, removably positioned in said tubular guide member with its inner end extending into the central cavity of said propellant grain, squib means in said elongated tube and positioned intermediate the ends thereof, a length of flexible fuse connected to said squib means and extending to the inner end of said elongated tube, pyrotechnic material enclosed in said elongated tube extending substantially from said squib means to the inner end of said elongated tube, and means for energizing said squib means extending from said squib means through the outer end of said elongated tube and through the wall of said combustion chamber.

9. An igniter for a rocket engine propellant grain having a central cavity, comprising: an elongated tube the major portion of which is made of a flexible material, squib means in said elongated tube positioned intermediate the ends thereof, a length of elongated flexible fuse connected to said squib means and extending to one end of said elongated tube, pyrotechnic material comprising a plurality of pyrotechnic pellets having central openings therein enclosed in said elongated tube extending substantially from said squib means to said one end of said elongated tube, said length of flexible fuse passing through the central openings in said pellets, and means for energizing said squib means extending from the other end of said elongated tube, said elongated tube being adapted to be inserted into the central cavity of a propellant grain through a curved tubular guide member.

10. An igniter assembly for igniting a solid propellant grain in the combustion chamber of a rocket, said igniter assembly comprising: rigid tubular adaptor means including an intermediate angular bend therein and adapted to be secured to the wall of the combustion chamber so as to extend within the combustion chamber, an elongated flexible tube received within said tubular adaptor means and extending through said angular bend thereof outwardly with respect to the inner end of said tubular adaptor means, pyrotechnic material filling said elongated flexible tube from an intermediate point therein to the inner end of said tube, a length of elongated flexible fuse extending through said pyrotechnic material, and means in said elongated flexible tube adjacent to said elongated flexible fuse for igniting said elongated flexible fuse to ignite said pyrotechnic material.

11. An igniter assembly as set forth in claim 10 wherein said tubular adaptor means comprises a single rigid adaptor tube having said intermediate angular bend therein and receiving said elongated flexible tube.

12. An igniter assembly as set forth in claim 10 wherein said tubular adaptor means comprises a first rigid tubular guide member and a second rigid tubular guide member angularly offset from said first tubular guide member, said second tubular guide member having an inner end intersecting the wall of said first tubular guide member to define the intermediate angular bend of said tubular adaptor means, and said elongated flexible tube having its outer end portion received in said second tubular guide member and passing into said first tubular guide member so as to extend outwardly with respect to the inner end thereof.

References Cited by the Examiner

UNITED STATES PATENTS

| | | | |
|---|---|---|---|
| 2,541,900 | 2/1951 | Williams | 60—39.82 X |
| 2,712,283 | 7/1955 | Golden | 60—35.6 X |
| 2,926,613 | 3/1960 | Fox | 60—35.6 |
| 3,027,839 | 4/1962 | Grandy et al. | 102—70 X |
| 3,062,147 | 11/1962 | Davis et al. | 102—70 |

MARK NEWMAN, *Primary Examiner.*

ABRAM BLUM, SAMUEL LEVINE, *Examiners.*

R. J. GOMEZ, W. J. KRAUSS, *Assistant Examiners.*